United States Patent [19]

Adams

[11] Patent Number: 4,668,889
[45] Date of Patent: May 26, 1987

[54] STATIC OVERPRESSURE PROTECTION SYSTEM FOR DIFFERENTIAL PRESSURE TRANSDUCER

[76] Inventor: Donald L. Adams, P.O. Box T, Tulia, Tex. 79088

[21] Appl. No.: 871,377

[22] Filed: Jun. 6, 1986

[51] Int. Cl.[4] .......................... H01L 41/08; G01L 7/08
[52] U.S. Cl. ..................................... 310/338; 73/706; 73/707; 73/DIG. 4
[58] Field of Search ........ 310/338, 337, 339, 330-332; 73/706, 707, 708, 715-727, DIG. 4

[56] References Cited

U.S. PATENT DOCUMENTS

| | | | |
|---|---|---|---|
| 3,187,711 | 6/1965 | Campolong | 116/70 |
| 3,590,626 | 7/1971 | Hugli | 310/338 |
| 3,780,588 | 12/1973 | Whitehead, Jr. et al. | 73/398 AR |
| 3,783,309 | 1/1974 | Alibert et al. | 310/338 |
| 3,841,158 | 10/1974 | Hunter | 73/707 X |
| 3,900,830 | 8/1975 | Peterson | 310/338 X |
| 3,967,504 | 7/1976 | Akeley | 73/707 X |
| 4,135,408 | 1/1979 | Di Giovanni | 73/721 |
| 4,136,603 | 1/1979 | Doyle, Jr. | 92/98 R |
| 4,163,395 | 8/1979 | Medler et al. | 73/708 |
| 4,172,388 | 10/1979 | Gabrielson | 73/721 |
| 4,208,737 | 6/1980 | Thompson et al. | 310/337 X |
| 4,212,200 | 7/1980 | Rousseau et al. | 73/861.47 |
| 4,218,925 | 8/1980 | Di Domizio | 73/706 |
| 4,264,889 | 4/1981 | Yamamoto et al. | 73/708 X |
| 4,306,460 | 12/1981 | Sakurai et al. | 73/721 |
| 4,321,578 | 3/1982 | Nagasu et al. | 338/42 |
| 4,347,745 | 9/1982 | Singh | 73/721 |
| 4,364,276 | 12/1982 | Shimazoe et al. | 73/721 |
| 4,412,203 | 10/1983 | Kurtz et al. | 338/4 |
| 4,425,526 | 1/1984 | Mount | 310/338 X |
| 4,453,417 | 6/1984 | Moyers et al. | 73/861.42 |
| 4,519,255 | 5/1985 | Ishii | 73/727 |
| 4,527,428 | 7/1985 | Shimada et al. | 73/721 |
| 4,546,653 | 7/1985 | Tobita et al. | 73/720 |
| 4,554,830 | 11/1985 | Khoi | 73/299 |
| 4,563,901 | 1/1986 | Singh | 73/706 |
| 4,600,912 | 7/1986 | Marks et al. | 310/338 X |

FOREIGN PATENT DOCUMENTS

| | | | |
|---|---|---|---|
| 895748 | 1/1960 | United Kingdom . | |
| 1080-044-A | 3/1984 | U.S.S.R. | 73/721 |

Primary Examiner—Mark O. Budd
Attorney, Agent, or Firm—Richards, Harris, Medlock & Andrews

[57] ABSTRACT

An improved differential pressure transducer is provided having static overpressure protection means. The overpressure protection means includes spring-loaded element being shiftable in response to an overpressure condition.

7 Claims, 3 Drawing Figures

STATIC OVERPRESSURE PROTECTION SYSTEM FOR DIFFERENTIAL PRESSURE TRANSDUCER

TECHNICAL FIELD

This invention relates to differential pressure transducers, and more particularly to transducers employing piezoelectric sensing elements.

BACKGROUND OF THE INVENTION

My invention is a mechanical system providing protection for unrestricted use of extremely sensitive and delicate piezoelectric chip pressure sensors in hostile industry environments. The art of building an extremely accurate piezoelectric sensor on a miniature silicon chip has developed to the extent that very inexpensive sensors are readily available. However, their nature is such that several parameters must be very closely controlled to keep variables other than the target change of pressure from grossly distorting their output, or from completely destroying the chip.

The following is a list of parameters my invention addresses and controls to make it practical and economical to use these inexpensive sensors in critical hostile environments:

1. It is highly possible that the instrument will experience pressures far above the design range of the sensor chip. A means must be provided to protect the sensor from medium pressures 10 to 100 times greater than what the sensor itself can withstand. Very severe pressure surges, pulses and oscillation can occur from water hammer and/or "noise" caused by pumps, throttling valves, etc. The sensor chip must be isolated from these destructive forces.

2. It is possible that the temperature of the environment surrounding the instrument can vary considerably (e.g., $-50°$ F. to $+200°$ F.). Therefore, the mechanical design of the sensor/transmitter system must be such that temperature change has minimum effect on the output signal.

3. Because the sensor is basically a subminiature strain gage, the system must eliminate the possibility of strain within the system being transferred to the sensor and being interpreted as a pressure induced output change.

4. Vibration is a common variable found in industry. The sensor and all related mechanical interface parts must be designed to withstand vibration over a long period of time. The design must also minimize the inertia and movement energy that can be conveyed to the sensor as a pressure pulse, thus resulting in a noisy signal in the presence of vibration.

SUMMARY OF THE INVENTION

A static overpressure protection system for a differential pressure transducer is provided. The system includes isolation diaphragms to hermetically seal the transducer on both sides, with pressure transmission to silicone oil. A protection diaphragm is maintained in a static condition by opposing spring-loaded pads. The diameter of the diaphragm and spring forces are selected to enable the appropriate pad to move once an overpressure condition is reached. The pad movement allows the isolation diaphragms to convert into a dynamic system in which the movement results in overpressure protection. After the overpressure condition subsides, the system resets itself into the static mode.

BRIEF DESCRIPTION OF THE DRAWINGS

For a more complete understanding of the present invention, reference is now made to the following Detailed Description taken in conjunction with the accompanying Drawings in which.

DETAILED DESCRIPTION

Figure 1:
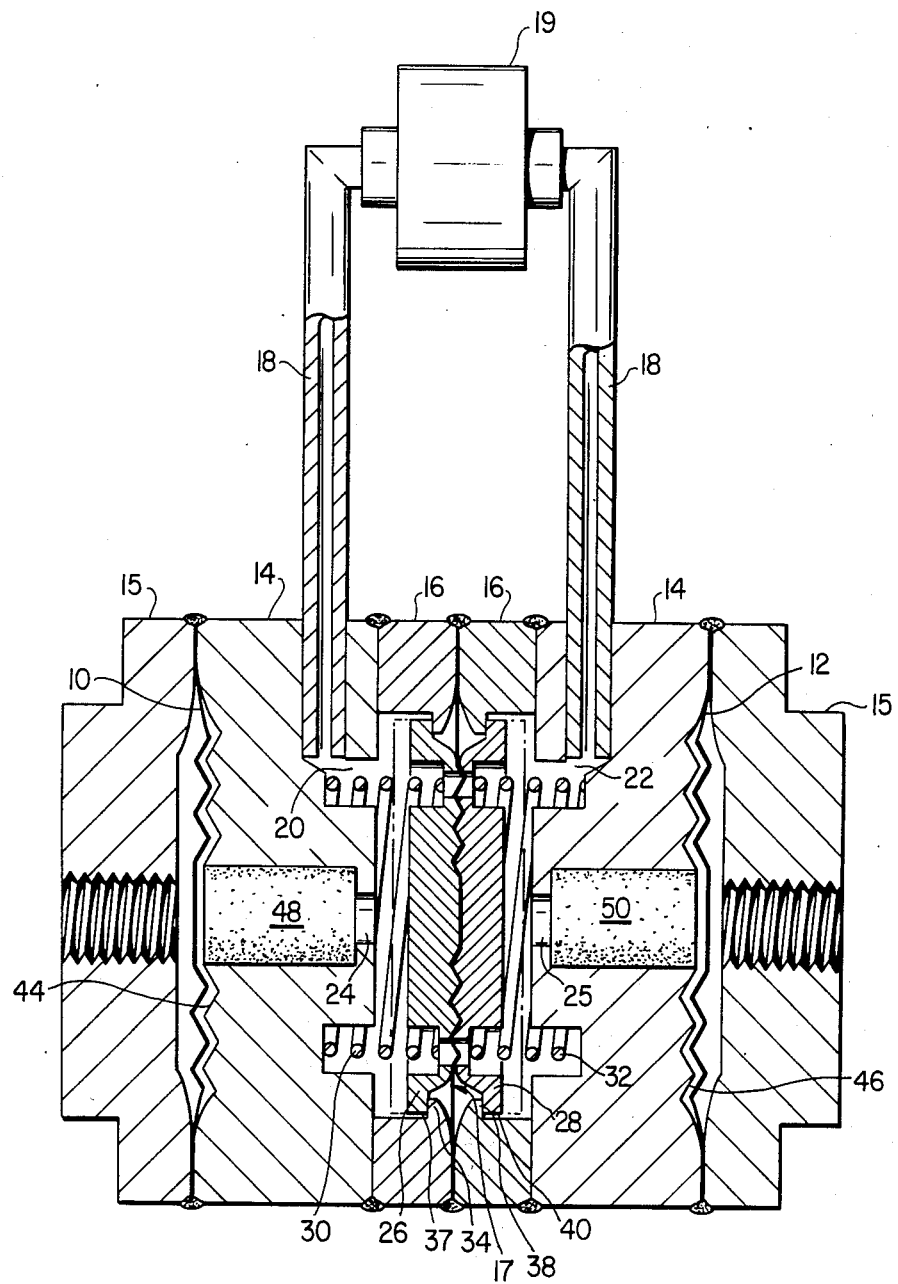
FIG. 1 is a partially broken away side view of the overpressure protection system of the present invention.

Referring initially to FIG. 1, the present invention includes diaphragms 10 and 12 welded or bonded to the circumference of body members 14 and interface members 15. Stop members 16 are welded or bonded to body members 14 as shown, with protection diaphragm 17 welded or bonded in between stop members 16. Pipes 18 connect conventional piezoelectric differential pressure sensor 19 to cavities 20 and 22 on opposite sides of protection diaphragm 17. Cavities 20 and 22 and the interior porting of the device are hermetically sealed by the welding steps set forth above. The interior is next evacuated to a hard vacuum through ports to the outside (not shown). Next the vacuum is replaced by silicone oil in such a manner as to completely fill all voids and eliminate any trace of uncondensed vapor and air within the device. This results in a perfect hydraulic coupling between diaphragm 10 and one side of conventional piezoelectric sensor 19 and between diaphragm 12 and the other side of sensor 19. The result is that any pressures imposed on the diaphragms 10 and 12 are transferred to the tiny diaphragm of sensor 19. Media can be thus "felt" by the sensor 19 without the media causing damage to the chip through chemical action.

A diaphragm-silicone oil isolation system is old in the art, and I claim no invention in this isolation process. However, in adapting this old art to the parameters of miniaturization and sensitivity of the piezoelectric chip sensor, problems arose in the areas of previously listed parameters that required considerable basic research and development to solve.

As previously explained, the pressures at the isolation diaphragms 10 and 12 are perfectly coupled against the very delicate silicon diaphragm of sensor 19, which may be only 5 to 10 molecules thick. Means must be provided to keep pressure surges, water hammer and overly high pressure from rupturing the sensor diaphragm. It has been found that the prior art method of providing overpressure protection via a dynamic O-ring valve is unworkable. In this prior art technique, the isolation diaphragms flex as pressure increases until the movement closes an O-ring valve to prevent further movement and thus higher pressure being transmitted to the sensor. In scaling down the diameter of isolation diaphragms 10 and 12 to the miniaturization level desired, the stiffness ratio of the isolation diaphragms to the tiny sensor diaphragm become high enough to interfere with diaphragm life and sensitivity of the sensor. That is, the energy it takes to flex the isolation diaphragm is too high with respect to the energy to flex the chip diaphragm. Providing a thinner diaphragm in the prior art technique is not a feasible solution.

Overpressure protection is provided by protection diaphragm 17, which is exposed on one side to low pressure induced through passageway 24, and exposed on the opposite side to the high pressure induced through passageway 25. Also provided are diaphragm pads 26 and 28 and springs 30 and 32. Compressed spring 30 pushes against pad 26 which in turn is retained from movement by stop 34 on stop member 16, which makes annular contact with pad 26 at lip 37. Similarly, compressed spring 32 pushes against pad 28, which in turn is retained from movement by stop 38, which makes annular contact with pad 28 at lip 40. Clearances are adjusted such that when full contact is made by pads 26 and 28 on to lips 37 and 40, diaphragm 17 is firmly captured between pads 26 and 28. Thus, diaphragm 17 is restrained to zero movement as long as pads 26 and 28 are resting against lips 37 and 40.

In operation, acting upon diaphragm 17 are opposing pressures through passageways 24 and 25, which result in opposing forces on diaphragm 17. As long as the force induced by pressure in passageway 24 is less than the force induced by spring 30 acting against pad 26, this system is static. When this force becomes greater than spring 30, diaphragm 17 will push pad 26 away from its resting stop at lip 37, thus allowing silicone oil to flow out of cavity 20 connected to passageway 24 and located adjacent diaphragm 10. When a portion of the oil moves out of cavity 20, diaphragm 10 is forced against back-up surface 44 and is no longer capable of increasing pressure in the silicone oil that is transmitting pressure to sensor 19. In this condition, media pressure can increase drastically and cause no further movement or strain on any of the overpressure sensing system or sensor 19. In fact, all parts of the overpressure sensing system are designed to be far below their elastic yield stress at this point and are calculated to withstand millions of cycles without fatigue failure. As long as pressure does not go high enough to exceed the elastic limits of back-up surface 44 there will be no damage or offset within the system. As pressure decreases to the point where spring force becomes less than the force of the pressure, diaphragm 17 and pad 26 will be forced back to their original positions, which in turn forces silicone oil back into cavity 20 exactly as it was before the overpressure condition was reached.

It should be noted that as diaphragm 17 moves and allows fluid to flow out of cavity 20, it also forces an equal volume of oil on the other side of diaphragm 17 to flex outward into cavity 22. The same well defined and controlled process takes place in mirror image fashion as high pressure on diaphragm 17 increases beyond the force of spring 32. Diaphragm 17 moves to collapse against back-up surface 46.

A key feature of the invention is that the overpressure protection is bi-directional. The overpressure protection point for high pressure is controlled by the spring rate of spring 30, and the low pressure protection point is controlled by spring 32 which can have a different spring rate. This invention thus allows overpressure protection if one side of sensor 19 to be of lower (or higher) value than on the other side of sensor 19. This is very desirable in that, by nature, a piezoelectric sensor is less suited to pressure on the low pressure side.

The volumes of the cavities between diaphragms 10 and 12 and back-up surfaces 44 and 46 are so small that the relative movement of diaphragms 10 and 12 are very minute, which allows an expected life span increase of 450% over some prior art systems. The very low volume of these cavities is made possible by the very exact reset position characteristic of my overpressure sensing system.

This system accomplishes the very desirable characteristic of no movements of components until such time as a maximum output signal condition is reached and the silicon chip is approaching danger. At that point, accuracy of the sensor output is no longer of concern and the signal distortions caused by moving parts and flexing diaphragms is not objectionable.

Since there is no movement in the normal mode, this system is somewhat less temperature change sensitive. Temperature has an effect on forces required for movement and for flexing of metal diaphragms.

This system is less susceptible to output distortions because of growth of materials caused by temperature change. The system is an exact or approximate mirror image design such that a change of volume of a part of volume of oil on one side of diaphragm 17 is offset by an equal change of the mirror image part or volume on the opposite side of diaphragm 17.

This system is also much less vibration sensitive in that it is static: there are no "floating" or free-to-move parts that can be readily affected by inertia. As previously described, the only moving parts of this system (pads 26 and 28) are firmly held against lips 37 and 40 by precompressed springs 30 and 32. In preferred form, the forces required to overcome the spring forces are in the order of 13 or 14 G's.

The system includes provision for sintered metal dampers 48 and 50 which serve two purposes. First, they provide fixed dampening to smooth out pressure peaks and noise. This pressure noise is very noticeable and objectionable when using the extremely sensitive piezoelectric sensor. Second, they provide a relatively solid surface against which the diaphragms 10 and 12 can bottom out under high pressure. If small openings were provided in back-up surfaces 44 and 46 for the silicone oil to flow through, the diaphragms 10 and 12 would extrude into the openings when under high pressure and be damaged. In the preferred embodiment, dampers 48 and 50 have a porosity of 1025 (25% porosity of 100 to 200 mesh sintered metal particles), such that the diaphragms can span the pores without damage at pressures up to 6000 psi.

The prior art technique of attaching a rod or plate to the inside center of diaphragm 10 and 12 and allowing this member to seat against an O-ring to affect a closed valve is unworkable in the present system. The sintered metal damper design overcomes the serious problems of incombatability of the old O-ring valve design and the supersensitive and delicate piezoelectric sensor. The response time of the old moving diaphragm O-ring valve design proved too slow to protect the fragile but very responsive diaphragm of the piezoelectric sensor. High frequency pressure spikes that elude the old O-ring valve overpressure system lead to early or unexplained failure of the sensor diaphragm. It has been discovered that the destructive energy of these sonic pressure spikes is absorbed by a maze of porous metal, such as dampers 48 and 50, strategically located such that the spike must pass through the full length of the damper before it can get to the sensor.

It has also been discovered that the moving diaphragm, moving bellows and O-ring valve overpressure protection systems of the prior art tend to induce a lack of reliable accuracy to the output of the sensitive silicon chip sensor. In the prior art systems, to get a strain signal into the sensor, it first has to come through the moving diaphragm system. On the massive, non-piezoelectric sensors used in conventional flow transducers, the energy absorbed by the flexing isolation diaphragm is insignificant when compared to the energy required to flex the big heavy sensor. Consequently, it is ignored in determining the ratio of pressure change to sensor output signal. However, the energy used to affect a change in the tiny piezoelectric sensor is so small that the isolation flexing energy of the prior art protection system becomes a significant part of the ratio of pressure change to sensor output signal. In addition, the diaphragm flexing energy cannot merely be considered as a constant and added to the sensor's requirement to make an overall system ratio of pressure change to sensor output signal. This is because the flexing energy requirement is not at all constant, and it has been found that measuring energy required to flex the diaphragm influenced the output signal as much as the exact pressure change that occurred. The "no movement" or static state system as described above eliminates the problems of using the prior art overpressure protection with the piezoelectric sensors.

FIG. 1 illustrates my overpressure and isolation system as described above with a remotely located sensor. The embodiment is fabricated by simply welding or bonding together parts 10, 12, 14, 15, 16, and 17 as shown by continuous weld seams to form an overpressure protection capsule. Pads 26 and 28, springs 30 and 32, and dampers 48 and 50 are incorporated into the device before assembly. Ports are drilled in parts 14 to allow insertion of pipes 18.

The embodiment of FIG. 1 has the advantage of complete independence between the sensor supplier and my isolation/overpressure capsule. Therefore, one may use any of several suppliers of differential pressure sensors and interface their sensor and their electronics to my protection capsule and have a complete transducer with minimum interaction. In addition, this embodiment can be configured as an absolute mirror image mechanism, which is of extreme importance to accomplish a system that is immune to temperature change.

It should be evident, however, that the invention is equally applicable where the sensor is incorporated within a body which also contains the overpressure protection system. Such a construction, with integral porting between the sensor and the cavities defined by diaphragms 10, 12 and 17, may be advantageous when miniaturzation is an important consideration.

Figure 2:
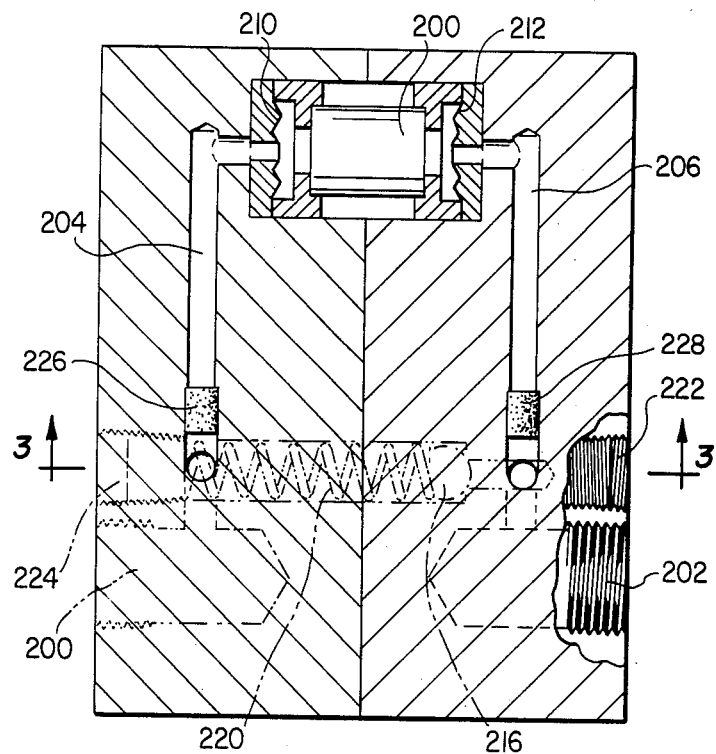
FIG. 2 is a partially broken away side view of an alternate embodiment of the present invention.
Figure 3:
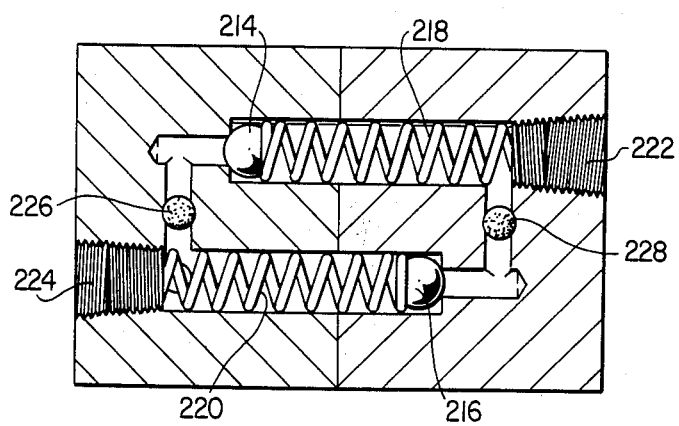
FIG. 3 is a sectional view taken along lines 3—3 of FIG. 2.

Referring now to FIGS. 2 and 3, a second embodiment of my invention includes high pressure port 200 and low pressure port 202. Ports 200 and 202 lead to passageways 204 and 206 respectively, which connect with piezoelectric sensor 208 by way of diaphragms 210 and 212. Positioned between ports 200 and 202 and passageways 204 and 206 are relatively large, spring loaded, one way relief valves formed by balls 214 and 216, springs 218 and 220, and plugs 222 and 224. The high pressure relief valve is calibrated such that if pressure on the high pressure port 200 relative to the low pressure port 202 increases to a level that approaches damage to the sensor, ball 214 will move and relieve pressure to the low pressure side. Similarly, if pressure on the low pressure side with respect to the high pressure side increases, ball 216 moves to relieve the overpressure situation.

Further, there are provided sintered metal dampers 226 and 228 between the relief valve systems and the transducer isolation diaphragms 210 and 212. Their purpose is to dampen pressure peaks resulting from bouncing action of the relief valves as well as other water hammer pressure spikes common to the system. It is common practice to provide a very small hole as a damper, but it has been found that solid particles common to industrial media are very prone to lodge in such holes and cause serious plugging problems. I have discovered that the chances of complete plugging of the many thousands of pores of a metal damper are much less than those of plugging a single small hole. This would not be true in designs where the media is forced to flow through the damper in one direction, but on this design, the media only "breathes" in a two-way fashion. It is further provided that dampers 226 and 228 are strategically located with their upstream surfaces shown in FIG. 3) adjacent the passageways between the ports and the relief valves such that the velocity of media occasionally flowing through ports 200 and 202 sweeps over the surfaces of the dampers to help keep particles moving away from the surface.

This embodiment (FIGS. 2 and 3) works well in relatively clean media applications, but has the potential of plugging, especially on waxy, viscous services. This embodiment is intended to be a less expensive substitute for the embodiment of FIG. 1 and is useful for less severe installations. This embodiment incorporates the advantages of the first embodiment, however, in that:

1. It is essentially static until an overpressure situation develops;
2. It is bi-directional in function; and
3. The pressure point at which protection starts can be set higher on one side of the sensor then the other.

In summary, with respect to the embodiments of FIGS. 1-3, the overpressure protection system is completely static (no moving parts) and induces absolutely no influence as the silicone oil faithfully transmits the media pressure applied to the isolation diaphragms. Further, this system is unaffected by broad temperature changes (i.e., plus or minus 200° F.) or by very high absolute pressures (i.e, 10,000 psi) imposed on the media being measured. Once an overpressure situation develops, (typically 10 psi differential), this system immediately limits further differential pressure rise even if the differential goes extremely high (i.e., 10,000 psi). When the high differential returns to normal, the system resets itself with no offset or change that would affect the accuracy of output signal from the sensor. This overpressure protection system can be repeatedly activated without failure or fatigue for thousands of cycles.

While specific embodiments of the present invention have been described in detail herein and shown in the accompanying drawings, it will be evident that various further modifications are possible without departing from the scope of the invention. In particular, it will be recognized that the overpressure protection system could be used to measure gauge, as opposed to differential, pressures by venting the low pressure side of the sensor to atmosphere. In a gauge pressure measuring system only one spring and pad would be provided.

I claim:
1. A differential pressure transducer comprising:
a piezoelectric sensor having a high pressure input and a low pressure input;
the high pressure input communicating with a first chamber partially defined by a first isolation diaphragm and one side of a protection diaphragm;

the low pressure input communicating with a second chamber partially defined by a second isolation diaphragm and the other side of the protection diaphragm; and first and second spring-loaded means acting on opposite sides of the protection diaphragm for maintaining the protection diaphragm in a static condition under normal operation and for allowing the protection diaphragm to move to relieve an overpressure condition.

2. The differential pressure transducer of claim 1 further comprising hydraulic media within the first and second chambers.

3. The differential pressure transducer of claim 2 wherein the first and second spring-loaded means includes first and second rigid pads located on opposite sides of the protection diaphragm, the pads being mechanically restrained from movement in a direction toward the isolation diaphragm and being biased by first and second springs in a direction towards the protection diaphragm.

4. The differential pressure transducer of claim 2 further comprising first and second porous dampers disposed in passageways between the first and second isolation diaphragms and the protection diaphragm.

5. The differential pressure transducer of claim 4 further comprising first and second back-up surfaces for physically restraining the first and second isolation diaphragms during an overpressure condition, the back-up surfaces being at least partially defined by surfaces on the first and second porous dampers to prevent extrusion of the first and second isolation diaphragms into the passageways between the first and second isolation diaphragms.

6. A differential pressure transducer comprising:
a piezoelectric sensor having first and second inputs;
the first and second inputs communicating with first and second chambers, each chamber containing a spring and a ball biased by the spring against an end of the chamber in a sealing arrangement;
first and second ports communicating with the first and second input; and
passageways leading from the backside of each ball to one of the first and second passageways, such that an overpressure condition in one of the passageways will cause the ball to move opening a communication between the first and second ports.

7. The differential pressure transducer of claim 6 further comprising sintered metal dampers located with their upstream surfaces along the passageways connected to the backsides of the balls.

* * * * *